United States Patent [19]

Daimer et al.

[11] 3,960,789

[45] June 1, 1976

[54] AQUEOUS COATING COMPOSITIONS COMPRISING FILM-FORMING POLYHYDROXY COMPONENT AND POLYVALENT FILM-FORMING RESIN WITHOUT POLYELECTROLYTE CHARACTER

[75] Inventors: Wolfgang Daimer; Gert Dworak, both of Graz, Austria

[73] Assignee: Vianova-Kunstharz A. G., Vienna, Austria

[22] Filed: Aug. 19, 1974

[21] Appl. No.: 499,334

[30] Foreign Application Priority Data

Aug. 20, 1973  Belgium .................................. 7217

[52] U.S. Cl. ............................... 260/21; 260/19 A; 260/20; 260/22 CQ; 260/29.2 TN; 260/29.2 N; 260/29.2 E
[51] Int. Cl.² ...................... C09D 3/52; C09D 3/56; C09D 3/66
[58] Field of Search .......... 260/21, 22 CQ, 29.2 TN, 260/29.2 N, 29.2 E, 19 A, 20

[56] References Cited
UNITED STATES PATENTS

| 3,251,790 | 5/1966 | Christenson et al. ................. 260/21 |
| 3,300,424 | 1/1967 | Hoenel et al. ......................... 260/21 |
| 3,412,056 | 11/1968 | Crawford et al. ..................... 260/21 |
| 3,506,601 | 4/1970 | Sekmakas ............................ 260/21 |
| 3,699,065 | 10/1972 | Clark .............................. 260/29.2 E |
| 3,714,090 | 1/1973 | Lasher ................................ 260/21 |

FOREIGN PATENTS OR APPLICATIONS

| 267,185 | 12/1968 | Austria ................................ 260/21 |
| 268,675 | 2/1969 | Austria ................................ 260/21 |

*Primary Examiner*—Ronald W. Griffin
*Attorney, Agent, or Firm*—A. W. Breiner

[57] ABSTRACT

Aqueous coating compositions without abnormal viscosity characteristic upon dilution with water are described. The coating compositions comprise (A) a resinous component which is a physical or chemical blend of a water-insoluble film-forming polyhydroxy compound having an acid value below about 10 mg KOH/g and a hydroxy number between about 50 and 650 mg KOH/g, and a film-forming polycarboxylic compound having an acid number from between about 30 and 280 mg KOH/g; the ratio of carboxy groups to hydroxy groups being 1 : 2 to 1 : 25 and the carboxy group at least partly neutralized with a nitrogen base diluted with water to a resin solids content of 35 to 60 percent in the presence of (B) a polyvalent film-forming resin without polyelectrolyte character and reactive with hydroxy groups, to provide a composition comprising 60 to 90 percent of (A) and 40 to 10 percent of (B) on a solids basis.

16 Claims, No Drawings

AQUEOUS COATING COMPOSITIONS COMPRISING FILM-FORMING POLYHYDROXY COMPONENT AND POLYVALENT FILM-FORMING RESIN WITHOUT POLYELECTROLYTE CHARACTER

FIELD OF INVENTION

This invention is directed to aqueous protective and decorative coating compositions. More particularly, it is directed to aqueous protective coating compositions employing resinous binders with polyelectrolyte structure.

BACKGROUND AND PRIOR ART

Aqueous coating compositions for the preparation of protective or decorative coatings have the advantage of being non-flammable, nonpollutant, and inexpensive, owing to the absence of organic solvents, i.e., aliphatic and aromatic hydrocarbons, organic esters or ketones, etc. These compositions are of two general types (1) dispersions of resinous materials which ultimately form the protective or decorative coatings, and (2) resinous binders with polyelectrolyte structure. Dispersions without polyelectrolyte structure consist of fine particles of resin and additives distributed in the aqueous phase, emulsifiers being necessary as aids for the distribution. The dispersions with a solids content of 50 percent have nearly the same viscosity as water and do not behave anomalously when further diluted with water. Coatings, however, prepared from dispersions of binders offer only low resistance to corrosion and, thus, corrosion protection, owing to the inclusion of the low molecular weight emulsifiers. Therefore, they are most commonly used in interior paints and decorative coatings; or in paper coatings and textile sizings. They have only limited use for coatings on corroding metals.

Water-dilutable binders with polyelectrolyte structure carry a number of saltlike groups in the macromolecule (soaps) and, contrary to dispersions, form colloidal or true solutions with water. The coatings obtained from such binders, optionally in the presence of polyvalent cross-linking resins (phenolic resins, amine resins, etc.) provide excellent corrosion protection of metals. Such binders consist of partial condensation products of resin-like polycarboxy compounds and polyhydroxy compounds in a molar ratio of about 1 : 1 and are, e.g., described in Austrian Patent Nos. 267,185 and 268,675. A practically identical product and procedure are described in Deutsche Offenlegungsschrift No. 17 69 129 according to which carboxy reactive resin components are partially esterified such that a polar-uniform product is obtained which is recommended for electrodeposition without co-employing polyvalent cross-linking resins.

Despite the known aforesaid advantages, the use of water-soluble binders with polyelectrolyte structure is restricted due to their peculiar behavior when diluted with water to a sufficiently low viscosity as is necessary for application by brushing, dipping, or spraying. Unlike solvent dissolved binders, with water-diluted binders the viscosity does not continuously decrease with increased diluent, but remains constant over a wide range of concentrations or will even rise in some cases. With high quantities of water and correspondingly low solids, the viscosity decreases rapidly within a very narrow range of concentrations (about 30–25 percent), and finally reaches almost the viscosity of water (E. Hüttmann et al, Plaste und Kautschuk 17, 202, 1970). This anomalous viscosity characteristic specific to the known water-dilutable binders entails a number of serious disadvantages, ruling out a general use of such binders including 1. The low binder solids concentration at application viscosity causes low film thickness of the dried cured coating and necessitates application of more than one coat in order to obtain a sufficiently thick and protective film;
2. The evaporation of such high quantities of water from the wet film takes long flash-off periods or an increased demand of heat energy. The presence of higher quantities of water in the film at the beginning of the cure leads to sizzling, cracking, splitting, or bursting of thick films; and
3. The steep reduction in viscosity within a narrow range of concentrations requires special precautions when adjusting the viscosity to application level, since the slightest deviations cause great fluctuations in viscosity.

The aforesaid factors make it difficult to work with water-dilutable binders, practically precluding their industrial use. Therefore, watersoluble binders have been mainly used up to now in electrodeposition coatings which require binder solids concentrations of less than 15 percent — beyond the critical range.

It is possible to bridge or reduce the aforesaid disadvantages on the application of water-soluble coating compositions by co-employing substantial quantities, i.e., above about 50 percent, of water-tolerant organic solvents, such as alcohols, ketones, or glycol ethers, and thereby obtain a dilution curve which is siimilar to that of solvent dissolved binders. Although such measures enable water-diluted binders to be applied, the special advantages of the waterborne binders are set off by the addition of the solvents.

OBJECTS AND GENERAL DESCRIPTION

Accordingly, it is a primary object of this invention to provide a process for producing aqueous coating compositions containing a maximum of about 40 percent organic solvents of the total diluents which do not exhibit abnormal viscosity characteristics when further diluted with water.

It is another object of this invention to provide an aqueous coating composition comprising resinous binders with polyelectrolyte structure which form colloidal or true solutions with water which do not exhibit abnormal viscosity characteristics upon dilution with water.

It is another object of this invention to provide aqueous coating compositions based on resinous binders with polyelectrolyte structure which form colloidal or true solutions with water which do not exhibit abnormal viscosity characteristics upon dilution with water making these compositions practical for commercial applications.

It is another object of this invention to provide aqueous coating compositions useful as decorative and protective coatings on metals which are substantially nonflammable, do not pollute the atmosphere, which are inexpensive, and which have excellent gloss, flexibility, and corrosion resistance.

These and other objects of the invention will be more readily apparent from the following description and the illustrative examples.

In accordance with the present invention, it is possible to prepare binders with partial polyelectrolyte structure which can be diluted with water without exhibiting the viscosity anomaly. The are sufficiently low in viscosity for application at high resin solids. The low content of organic solvent which is due to the production process is far below the level necessary up to now for acceptable organic solvent modified water-soluble coating compositions. With the coating compositions of the present invention it is possible to apply coatings with sufficient film thickness in one application, the coatings upon curing yielding flawless films with excellent characteristics, including good gloss, hardness, flexibility, and corrosion resistance. Owing to the exclusive use of water for the further dilution, material costs are reduced and the atmosphere is not polluted by evaporating solvents. The present invention, therefore, is concerned with a process for producing an aqueous coating composition which may or may not contain pigments, fillers, paint additives, etc., based on synthetic resin solutions containing a maximum of 40 percent of organic solvents of the total diluents, and which do not exhibit viscosity anomaly in the presence of water. The composition is characterized in that in the preparation of the resin binder, a water-insoluble film-forming polyhydroxy compound (PH) with an acid value of below 10 mg KOH/g and a hydroxy number of 50 – 650 mg KOH/g, is mixed or partially condensed with a film-forming polycarboxylic compound (PC) with an acid value of 30 – 280 mg KOH/g in a molar ratio of 1: 2 to 1 : 25, preferably 1 : 3 to 1 : 10, of carboxy groups to hydroxy groups, the carboxy groups being partially or completely neutralized with nitrogen bases, and 60 – 90 percent by weight of the PH-PC combination product (calculated as solids) is diluted with water to a resin solids content of 35 – 60 percent in the presence of 10 – 40 percent (calculated as solids) of a polyvalent film-forming resin without polyelectrolyte character reactive with hydroxy groups.

In practicing the invention, suitable film-forming polyhydroxy compounds (PH) are characterized by their content of hydroxy groups and are substantially free from carboxy groups, providing the low acid value, i.e., below about 10 mg KOH/g, and a hydroxy number between about 50 and 650 mg KOH/g. Within the aforesaid specifications, the polyhydroxy compounds (PH) are easily produced in known manner by condensation of excess polyols such as monoethylene glycol, diethylene glycol, triethylene glycol, glycerol, trimethylol propane, pentaerythritol, with polycarboxylic acids or anhydrides such as phthalic acid, terephthalic acid, trimellitic acid, succinic acid, adipic acid, sebacic acid, etc., optionally co-employing monocarboxylic acids with 5 – 20 C-atoms. Additionally, the polyhydroxy compounds can be prepared by the reaction of excess polyol with diisocyanates, e.g., toluylene diisocyanate or hexamethylene diisocyanate. Suitable polyhydroxy compounds are also obtained by co-polymerization of alpha, beta-ethylenically unsaturated compounds carrying free hydroxy groups such as ethylene glycol monomethacrylate with co-polymerizable vinyl compounds such as esters of acrylic or methacrylic acid with monohydric alcohols, acrylamide or methacrylamide, styrol, vinyltoluol and other monomers. The co-polymers may also be condensation products with small quantities of formaldehyde-condensation products of melamine, urea, benzoguanamine, phenols, etc. The critical characteristic is that the polyhydroxy compound is a film-forming, forming, water-insoluble compound having an acid value below about 10 mg KOH/g and a hydroxy number between about 50 – 650 mg KOH/g.

The film-forming polycarboxy compounds (PC) can be referred to as a macromolecular emulsifier taking an integral part in the formation of the film on curing. Suitable polycarboxylic compounds are those with an acid number from between about 30 and 280 mg KOH/g. These resins can be obtained through reaction of hydroxy-rich pre-condensates with di- or tricarboxylic acid anhydrides, e.g., of hydroxy-rich polyesters or polyurethanes with phthalic anhydride or trimellitic anhydride. Preferred resins are the addition compounds of dienophilic compounds, e.g., maleic anhydride, to unsaturated compounds with a molecular weight of more than 500. Among these are the esters of natural unsaturated fatty acids and rosin acids with polyalcohols, e.g., glycerol, pentaerythritol or with compounds carrying epoxy groups, such as glycidylethers of Bisphenol A. Another group of suitable unsaturated compounds capable of addition reactions are diene polymers (butadiene, isoprene). When using such addition products the anhydride groups of the polycarboxy compound, prior to its use according to the invention, are opened with water or a monohydric alcohol. Further suitable polycarboxy compounds are co-polymers of acrylic or methacrylic acid with other alpha,beta-ethylenically unsaturated monomers, such as (meth)acrylates, styrol, vinyl toluol, and self-curing polymers as are described in Austrian Patent Nos. 291,572 and 299,543. The carboxy groups of the polycarboxy compound are neutralized partly at least with nitrogen bases like ammonia, aliphatic amines or aliphatic alkanolamines. Examples are diethylamine, triethylamine, N,N'-dimethylethanolamine, and diethanolamine.

The polyhydroxy compound and polycarboxy compound, in the ratio of carboxy to hydroxy groups of 1 : 2 to 1 : 25, can be combined by simple mixing, or the two components can be partially condensed at temperatures between 80 and 140° C. The partial condensation procedure is advisable if the compatibility (homogeneity of the polyhydroxy compound and polycarboxy compound) of the two components is to be enhanced. The condensation must not be carried to the point where the solubility in water is lost. In most cases it is sufficient to reduce the acid value of the combination product by 8 – 15 units below that of the starting blend.

In order to increase the degree of cross-linking of the combination product, 10 – 40 percent (of total binder) of polyvalent resins without polyelectrolyte character, reactive with hydroxy groups are co-employed. Such products are condensation products of formaldehyde with urea, melamine, benzoguanamine, phenol, cresol, p-tert.butylphenol, optionally etherified with monohydric alcohols. These products, which are commercially available, are known in the art.

The combination products of the invention, upon addition of water form a dispersion or emulsion in which the water-insoluble component polyhydroxy compound is stabilized by the water-soluble macromolecular component polycarboxy compound. In some particularly preferred cases the dispersions or emulsions obtained through the addition of water are clear in the application concentration and become turbid only at lower concentrations, which, however, need not be attained and which do not bring about any advantages. The coating compositions of the invention yield a clear film upon evaporation of water and the co-solvents eventually present.

The coating compositions of the invention can be applied as a clear varnish or as a pigmented paint. Examples of suitable pigments are titanium dioxide, iron oxide, carbon black, silicate pigments, lithopone, phthalocyanine pigments, etc. The coating compositions may also contain paint additives, for instance, pigment wetting agents, anti-floating agents, anti-foaming agents, anti-skinning agents, and surface acids. Silicones are also normally used additives for enhancing scratch resistance or to obtain special effects.

The following specific embodiments illustrate the invention without limiting the scope thereof. Parts are by weight unless otherwise stated.

POLYCARBOXYLIC COMPONENTS

Preparation PC-A 156 g dehydrated castor oil and 78 g linseed oil are stirred for one hour at 250°C under the protection of inert gas. The temperature is allowed to drop to 200° C, and at 200° C 100 g of maleic anhydride are added. After about 10 hours of reaction at 210°C, no free maleic anhydride can be traced. After dropping the temperature to 100°C, 70 g of diacetone alcohol, 30 g of water, and 2 g of triethylamine are added. 100°C is held for 2 hours, then the batch is cooled. The resin has a solids content of 85% and an acid value of 250 mg KOH/g.

PREPARATION PC-B 148 g of phthalic anhydride and 62 g of ethanediol-1,2 are heated to 140°C and held until the acid value has fallen to 264 mg KOH/g. 42 g diacetone alcohol are added to obtain a 83% (solids) resin solution.

PREPARATION PC-C 37.5 g of a water-insoluble butanol etherified melamine resin, 80% solids in butanol, carrying an average of 5.5 mols of formaldehyde and 4.5 mols of butanol per mol of melamine, 5 g of acrylic acid, 10 g of methacrylic acid, 31 g of butylacrylate, 24 g of styrol, 27 g of ethylene glycol monobutylether, 2 g of dicumylperoxide, and 6 g of tertiary dodecylmercaptan are dissolved to a homogeneous blend. One-third of the blend is charged to a reaction vessel equipped with a stirrer and reflux condenser and heated to reflux temperature under the protection of inert gas. The remainder of the blend is added continuously over a period of 4 hours and the temperature is held for a further 6 hours during which 3 g of dicumylperoxide, dissolved in 30 g of ethyleneglycol monobutylether, are added twice. The reaction is stopped at a solids content of 70%. The light colored resin has an acid value of 85 mg KOH/g.

Preparation PC-D

A saturated polyester resin with an acid number of 50 – 55 mg KOH/g is produced through esterification and elimination of the reaction water from 146 g of adipic acid, 210 g of trimethylol propane, 496 g of a glycidyl ester of alpha-branched $C_9$–$C_{11}$ monocarboxylic fatty acids (e.g., Cardura E of Shell), 192 g of trimellitic anhydride and 148 g of phthalic anhydride. The hydroxyl number is about 140 mg KOH/g. The resin is diluted to 83% solids with ethylene glycol monoethyl ether.

POLYHYDROXY COMPONENTS

Preparation PH-M 150 g of triethylene glycol and 148 g of phthalic anhydride are heated to 150°C in a reaction vessel equipped with stirrer and Dean and Stark receiver; the temperature is held until an acid value of 188 mg KOH/g is obtained. Then 134 g of trimethylol propane are added and the esterification is carried on at 220°C, until the acid value is below 5 mg KOH/g, about 27 g of water of reaction being formed. The resin is allowed to cool. The recorded time according to DIN 53 211 for a 70% solution of the resin in ethylene glycol monbutyl ether is about 80 seconds. The resin has a hydroxyl number of 370 mg KOH/g, DIN 53 240.

Preparation PH-N

In a reaction vessel equipped with stirrer and reflux condenser, 174 g of toluylene diisocyanate (isomer blend of 80% of 2,4-diisocyanate and 20% of 2,6-diisocyanate) are added to 124 g of ethane diol-1,2 within 2 hours. The temperature rises to 60°C. The reaction is completed through stirring for 2 hours at 100°C. The hydroxyl number is 360 mg KOH/g. The batch is diluted to 70% solids with diacetone alcohol.

Preparation PH-O 106 g of diethylene glycol and 296 g of phthalic anhydride are heated to 150°C. When the acid value is about 280 mg KOH/g, 150 g of 1-2-epoxy propanol-3 are added continuously over a period of 2 hours at 150°C. When the reaction is finished, the acid value has fallen below 5 mg KOH/g. The hydroxyl number of the product is 395 mg KOH/g.

EXAMPLE 1

In a reaction vessel equipped with stirrer and reflux condenser 36 g polycarboxy component PC-A, and 70 g of polyhydroxy component PH-M are heated to 120°C and condensed for about 1 hour until the acid value has fallen from 76 mg KOH/g to 68 mg KOH/g. The batch is diluted with 14 g of ethyleneglycol-monobutylether and 9 g of sec-butanol. Upon addition of a commercially available melamine resin carrying an average of 4.5 mols of formaldehyde and 3.5 mols of methanol per mol of melamine, 65% solids, in water and glycol ethers, a total of 157 g of a resin solution with 75% solids is obtained. 6 ml of triethylamine are added and the solution is further diluted with water. The viscosities recorded on solutions with decreasing solids content and the appearance of the solutions are tabulated in Table 1. The ratio of carboxy to hydroxy groups is about 1 : 4. The solutions with 50% solids content are applied to cold rolled degreased steel panels and allowed to flash-off at room temperature for 10 minutes. The panels are cured at 150°C for 30 minutes. The coating has a film thickness of 30 μm, is clear, has a deep gloss, and is scratch resistant. In the Erichsen ball test with the testing apparatus type 304, the coating withstands an impact of 80 inch-pounds without damage. A water soak test at 40°C for 100 hours does not adversely affect the coating, i.e., there is no blistering.

EXAMPLE 2

The procedure of Example 1 is repeated with the one alteration that the polycarboxy component PC-A and the polyhydroxy component PH-M are blended at room temperature. The further additions, such as solvents, melamine resin, triethylamine and water are the same as in Example 1. The viscosities recorded on solutions with decreasing solids content and the appearance of the solutions are tabulated in Table 1. A coating is prepared as in Example 1, with properties similar to those of Example 1 being obtained.

EXAMPLE 3

36 g of polycarboxy component PC-B, 100 g of polyhydroxy component PH-N, 25 g of hexamethoxymethylmelamine and 6 g of diacetone alcohol are blended to a homogeneous mixture at room temperature, having a solids content of 75%. Upon addition of 5.5 ml of triethylamine the mixture is further diluted with water. The viscosities recorded with falling solids content and the appearance of the solutions are tabulated in Table 1. The ratio of carboxy groups to hydroxy groups is about 1 : 3.3. The solution with 50% solids content is applied to cold rolled degreased steel and, after short flash-off, is cured at 150°C for 30 minutes. A hard, slightly yellow film with good water resistance is obtained.

EXAMPLE 4

71.5 g of polycarboxylic component PC-C, 50 g of polyhydroxy component PH-M, 13 g of hexamethoxy methylmelamine and 12.5 ml of triethylamine are mixed at room temperature and diluted to 75% solids with 5 g of sec-butanol. The resin is further diluted with water. The viscosities recorded on solutions with falling solids content and the appearance of the solutions are tabulated in Table 1. The ratio of carboxy groups to hydroxy groups is about 1 : 5.

EXAMPLE 5

73 g of polycarboxy component PC-D, 40 g of polyhydroxy component PH-O and 20 g of hexamethoxymethylmelamine are mixed, neutralized with 5 g of dimethylethanolamine and diluted with 62 g of distilled water. The ratio of carboxy/hydroxy groups in this binder is about 1 : 7. The aqueous solution is clear. Half of the binder solution is pigmented with 80 g titanium dioxide on a mill and mixed with the second half of the binder solution. Upon addition of 60 g of water, a paint ready for application is obtained, which is sprayed onto steel panels and cured for 30 minutes at 140 C. The coating has a König pendulum hardness of 140 s, an Erichsen impact flexibility of 80 inch-pounds and shows no effect upon soaking in distilled water at 40°C for 10 days.

COMPARISON EXAMPLE X

This example illustrates the behavior upon dilution of a purely polycarboxylic acid resin, blended with about 20% of a melamine resin for sufficient hardness.

120 g of polycarboxylic component PH-A are mixed with 27 g of the melamine resin used in Example 1 and diluted to 75% solids with 6 g of ethylene glycol monobutylether and 4 g of sec-butanol. Upon addition of 20 ml triethylamine the resin is further diluted with water. The viscosities recorded on solutions with falling solids content and the appearance of the solutions are recorded in Table 1.

COMPARISON EXAMPLE Y

This example is to demonstrate the technical advance over the art as, e.g., set forth in Austrian Patent No. 268,675 according to which the ratio carboxy groups to hydroxy groups is 1 : 1.

208 g of polycarboxy component PC-A and 144 g polyhydroxy component PH-M are heated to 120°C in a reaction vessel equipped with stirrer and reflux condenser. The acid value at the beginning of reaction is 121 mg KOH/g. The temperature is held and the water solubility is checked every hour on samples diluted with ethylene glycol monobutylether and neutralized with triethyl amine. After a reaction time of 7 hours, the desired solubility in water is obtained. The acid value is 108 mg KOH/g. The resin is diluted to 75% solids with 32 g of ethylene glycol monobutylether and 44 g of sec-butanol. 26 ml triethylamine are added for neutralization and 85 g of the melamine resin used in Example 1 are added. The resin is further diluted with water. The viscosities recorded on solutions with falling solids content and the appearance of the solutions are tabulated in Table 1.

The aqueous coating compositions of Examples 1 – 5 as to physical properties and film formation compare favorably with the characteristics of Examples X and Y. However, the coating compositions of Examples 1 – 5 can be readily diluted with water, permitting their use at high solids content to permit application of a single thick coating without adverse effect. In contradistinction, the coating compositions of Examples X and Y, as seen from Table 1, exhibit abnormal viscosity characteristics upon dilution with water, precluding their use for many commercial applications.

As will be apparent to one skilled in the art, various modifications can be made within the scope of the aforesaid description. It is possible to modify the resinous components provided they fall within the critical characteristics set forth in the specification. Moreover, it is possible to modify the coating compositions in known manner by the inclusion of conventional additives for their intended purpose. These modifications being within the ability of one skilled in the art form a part of the present invention and are embraced by the appended claims.

TABLE 1

| | Viscosity in cp and appearance of the solution upon dilution with water to a solids content of . . . % | | | | | | | | | |
|---|---|---|---|---|---|---|---|---|---|---|
| | 65% | 60% | 55% | 50% | 45% | 40% | 35% | 30% | 25% | 20% |
| Example 1 | 928 clear | 576 clear | 312 clear | 303 clear | 234 clear | 182 clear | 121 slightly turbid | 80 slightly turbid | — | — |
| Example 2 | 839 clear | 470 clear | 290 clear | 260 clear | 183 clear | 123 slightly turbid | 93 slightly turbid | 45 sightly turbid | — | — |
| Example 3 | 360 clear | 189 clear | 113 clear | 74 clear | 60 clear | 50 slightly | 28 sightly | — | — | — |

TABLE 1-continued

| | Viscosity in cp and appearance of the solution upon dilution with water to a solids content of . . . % | | | | | | | | | |
|---|---|---|---|---|---|---|---|---|---|---|
| | 65% | 60% | 55% | 50% | 45% | 40% | 35% | 30% | 25% | 20% |
| Example 4 | — | 410 nearly clear | 293 nearly clear | 265 slighty turbid | 224 sightly turbid | turbid 191 slightly turbid | turbid 175 turbid | 140 turbid | 95 turbid | — |
| Comparison Example X | 33,300 clear | 12,300 clear | 5,500 clear | 4,400 clear | 2,860 clear | 4,300 clear | 3,900 clear | 3,800 clear | 331 slightly turbid | 38 slightly turbid |
| Comparison Example Y | 24,700 clear | — | 6,150 clear | — | 3,560 clear | — | 1,930 clear | — | 152 slightly turbid | — |

The viscosity was measured with a synchrolectric viscosimeter of Brookfield, at 25°C.

It is claimed:

1. Process for producing aqueous coating compositions having a maximum of 40 percent of organic solvents based on the total solvents of said composition and which exhibit viscosity characteristics upon dilution with water suitable for application by brushing, dipping, or spraying, comprising the steps of (I) providing a resinous component (A) which includes a water-insoluble film-forming polyhydroxy component having an acid value below about 10 mg KOH/g and a hydroxyl number of from about 50 to 650 mg KOH/g and a film-forming polycarboxy component having an acid value of from about 30 to 280 mg KOH/g, the ratio of carboxy groups to hydroxy groups in said resinous component (A) being from about 1 : 2 to 1 : 25, and the carboxy groups being at least partially neutralized with a nitrogen base; and (II) diluting said resinous component (A) with water to a resin solids content of from about 35 to 60 percent in the presence of a polyvalent film-forming resin (B) without polyelectrolyte character and reactive with hydroxyl groups selected from the group consisting of condensation products of formaldehyde with urea, melamine, benzoguanamine, and phenol, and said condensation products esterified with a monohydric alcohol, the ratios of (A) and (B) being selected to provide an aqueous coating composition calculated as resin solids of 60 to 90 percent by weight of said resin component (A) and 10 to 40 percent by weight of said polyvalent film-forming resin (B).

2. The process of claim 1 wherein the ratio of carboxyl groups to hydroxyl groups in resinous component (A) is from 1 : 3 to 1 : 10.

3. The process of claim 1 wherein the film-forming polycarboxylic component is the addition product of maleic anhydride and an unsaturated fatty acid ester.

4. The process of claim 1 wherein the film-forming polyhydroxy component is an ester of a dicarboxylic acid and a polyol.

5. The process of claim 1 wherein the polyvalent film-forming resin (B) is hexamethoxymethylmelamine.

6. The process of claim 1 wherein the film-forming polyhydroxy component is a member of the group consisting of
   a. polyesters derived from polyols and polycarboxylic acids or anhydrides thereof;
   b. polyesters derived from polyols and polycarboxylic acids or anhydrides thereof co-employing monocarboxylic acids with from 5 to 20 carbon atoms;
   c. reaction products of polyols and diisocyanates; and
   d. copolymerization products of alpha,beta-ethylenically unsaturated hydroxy monomers and copolymerizable vinyl compounds;

the film-forming polycarboxy component is a member selected from the group consisting of
   a. reaction products of hydroxy-rich polyesters and polycarboxylic acids;
   b. reaction products of hydroxy-rich polyurethanes and polycarboxylic acids;
   c. reaction products of a dienophilic compound and an unsaturated component with a molecular weight of more than 500; and
   d. carboxyl-containing copolymers;

and the nitrogen base is a member of the group consisting of ammonia, an aliphatic amine, and an aliphatic alkanolamine.

7. The process of claim 1 wherein the film-forming polyhydroxy component and the film-forming polycarboxy component of resinous component (A) are physically mixed.

8. The process of claim 1 wherein the film-forming polyhydroxy component and the film-forming polycarboxy component of resinous component (A) are blended by heating.

9. An aqueous coating composition having a maximum of 40 percent of organic solvents based on the total solvents of said composition exhibiting viscosity characteristics upon dilution with water suitable for application by brushing, dipping, or spraying, comprising a resinous component (A) which includes a water-insoluble film-forming polyhydroxy component having an acid value below about 10 mg KOH/g and a hydroxyl number of from about 50 to 650 mg KOH/g, and a film-forming polycarboxy component having an acid value of from about 30 to 280 mg KOH/g, the ratio of carboxy group to hydroxy group in said resinous component (A) being from 1 : 2 to 1 : 25 and the carboxy groups being at least partially neutralized with a nitrogen base, and a polyvalent film-forming resin (B) without polyelectrolyte character and reactive with hydroxyl groups selected from the group consisting of condensation products of formaldehyde with urea, melamine, benzoguanamine, and phenol, and said condensation products esterified with a monohydric alcohol, the ratio of (A) and (B) being selected to provide an aqueous coating composition calculated as resin solids of 60 to 90 percent by weight of said resin component (A) and 10 to 40 percent of said polyvalent film-forming resin (B), said composition being diluted with water to provide a composition having a resin solids content of from about 35 to 60 percent.

10. The composition of claim 9 wherein the ratio of carboxyl groups to hydroxyl groups in resinous component (A) is from 1 : 3 to 1 : 10.

11. The composition of claim 9 wherein the film-forming polycarboxylic component is the addition product of maleic anhydride and an unsaturated fatty acid ester.

12. The composition of claim 9 wherein the film-forming polyhydroxy component is an ester of a dicarboxylic acid and a polyol.

13. The composition of claim 9 wherein the polyvalent film-forming resin (B) is hexamethoxymethylmelamine.

14. The aqueous coating composition of claim 9 wherein said film-forming hydroxy component is a member of the group consisting of
  a. polyesters derived from polyols and polycarboxylic acids or anhydrides thereof;
  b. polyesters derived from polyols and polycarboxylic acids or anhydrides thereof co-employing monocarboxylic acids with from 5 to 20 carbon atoms;
  c. reaction products of polyols and diisocyanates; and
  d. copolymerization products of alpha,beta-ethylenically unsaturated hydroxy monomers and copolymerizable vinyl compounds;

the film-forming polycarboxy component is a member selected from the group consisting of
  a. reaction products of hydroxy-rich polyesters and polycarboxylic acids;
  b. reaction products of hydroxy-rich polyurethanes and polycarboxylic acids;
  c. reaction products of a dienophilic compound and an unsaturated component with a molecular weight of more than 500; and
  d. carboxyl-containing copolymers;

and the nitrogen base is a member of the group consisting of ammonia, an aliphatic amine, and an aliphatic alkanolamine.

15. The composition of claim 9 wherein the film-forming polyhydroxy component and the film-forming polycarboxy component of resinous component (A) are physically mixed.

16. The composition of claim 9 wherein the film-forming polyhydroxy component and the film-forming polycarboxy component of resinous component (A) are blended by heating.

* * * * *

UNITED STATES PATENT AND TRADEMARK OFFICE
CERTIFICATE OF CORRECTION

PATENT NO. : 3,960,789
DATED : June 1, 1976
INVENTOR(S) : Wolfgang DAIMER ET AL

It is certified that error appears in the above-identified patent and that said Letters Patent are hereby corrected as shown below:

Title page, the priority date should read
-- Aug. 20, 1973  Austrian ........ A 7217/73 --;

Column 4, line 1, after "film-forming," delete "forming,".

Signed and Sealed this

Fifteenth Day of November 1977

[SEAL]

Attest:

RUTH C. MASON
Attesting Officer

LUTRELLE F. PARKER
Acting Commissioner of Patents and Trademarks